(12) United States Patent
Tune et al.

(10) Patent No.: US 8,266,482 B2
(45) Date of Patent: Sep. 11, 2012

(54) OPERATING PARAMETER CONTROL FOR INTEGRATED CIRCUIT SIGNAL PATHS

(75) Inventors: Andrew David Tune, Dronfield (GB); Alistair Crone Bruce, Stockport (GB); Simon Crossley, Sheffield (GB); Robin Hotchkiss, Sheffield (GB)

(73) Assignee: ARM Limited, Cambridge (GB)

( * ) Notice: Subject to any disclaimer, the term of this patent is extended or adjusted under 35 U.S.C. 154(b) by 1084 days.

(21) Appl. No.: 12/087,007

(22) PCT Filed: Jan. 31, 2006

(86) PCT No.: PCT/GB2006/000313
§ 371 (c)(1),
(2), (4) Date: Jun. 24, 2008

(87) PCT Pub. No.: WO2007/088315
PCT Pub. Date: Aug. 9, 2007

(65) Prior Publication Data
US 2009/0287978 A1 Nov. 19, 2009

(51) Int. Cl.
*G06F 11/00* (2006.01)
(52) U.S. Cl. ......... 714/712; 714/716; 714/752; 714/774
(58) Field of Classification Search ........................ None
See application file for complete search history.

(56) References Cited

U.S. PATENT DOCUMENTS

| | | | | |
|---|---|---|---|---|
| 5,444,719 A * | 8/1995 | Cox et al. | | 714/769 |
| 6,742,154 B1 * | 5/2004 | Barnard | | 714/752 |
| 6,772,388 B2 * | 8/2004 | Cooper et al. | | 714/774 |
| 7,032,159 B2 * | 4/2006 | Lusky et al. | | 714/774 |
| 2009/0269056 A1 * | 10/2009 | Fan et al. | | 398/27 |
| 2010/0023836 A1 * | 1/2010 | Miyoshi et al. | | 714/751 |

OTHER PUBLICATIONS

International Search Report for PCT/GB2006/000313, mailed Aug. 2, 2006.
Written Opinion of the International Searching Authority for PCT/GB2006/000313, mailed Aug. 2, 2006.
International Preliminary Report on Patentability for PCT/GB2006/000313, mailed Jan. 15, 2008.
Benini L. et al., "Networks on Chip: A New Soc Paradigm", Computer, IEEE, vol. 35, No. 1, pp. 70-78, (Jan. 1, 2002).
Worm F., et al., "Self-Calibrating Networks-On-Chips", Circuits and Systems, pp. 2361-2364, (May 23, 2005).
Beers G., et al., "A Novel Memory Bus Driver/Receiver Architecture for Higher Throughput", VLSI Design, pp. 259-264, (Jan. 4, 1998).

(Continued)

*Primary Examiner* — Christopher McCarthy
(74) *Attorney, Agent, or Firm* — Nixon & Vanderhye P.C.

(57) ABSTRACT

An integrated circuit includes a signal source and a signal destination linked by a signal path. Error correction codes (e.g. Hamming codes) are applied to the signals to be transmitted. Errors detected in the signal transmission are used to control an operating parameter of the signal path, such as signal voltage level, body bias voltage, clock frequency and/or temperature. The control applied is closed-loop feedback control seeking to maintain a finite non-zero predetermined error rate. The technique can also be used between a memory accessing integrated circuit and a separate memory integrated circuit. Furthermore, the technique can be used to provide fixed, but differing operating parameters for signal lines within a signal path. Control signals which may be timing critical are passed with appropriate operating parameters, such as a high signal voltage level, where as other signals, such as address and data signals, are passed with a different appropriate operating parameter, such as a low signal voltage level.

14 Claims, 4 Drawing Sheets

OTHER PUBLICATIONS

Figure 1:
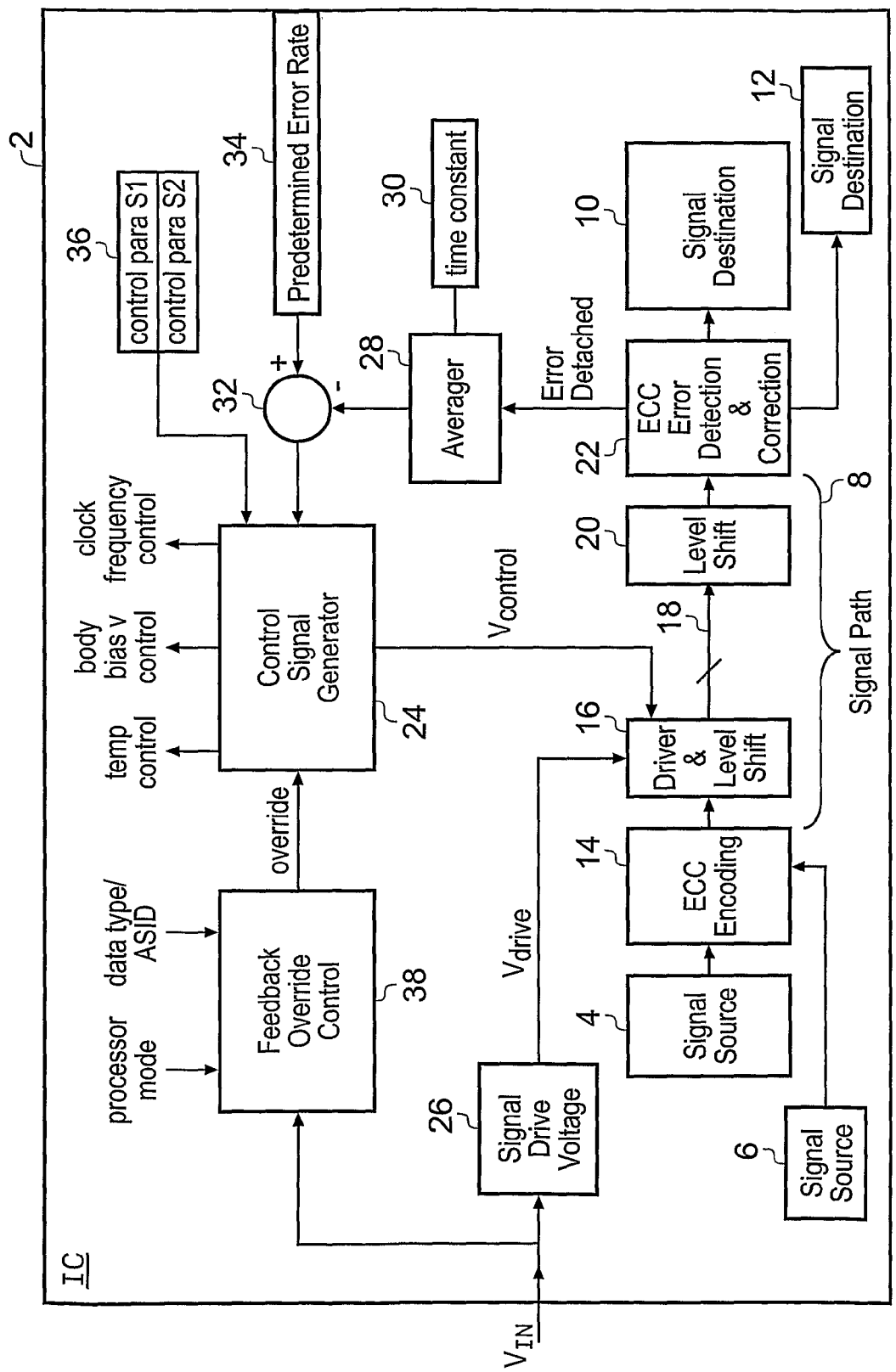

Zimmer H et al., "A Fault Model Notation and Error-Control Scheme for Switch-To-Switch Buses in a Network-On-Chip", CODES + ISSS, vol. Conf. 1, pp. 188-193, (Oct. 1, 2003).

Stan M. R., et al., "Bus-Invert Coding for Low-Power I/O", 8432 IEEE Transactions on Very Large Scale Integration (VLSI) Systems, vol. 3, No. 1, pp. 49-58, (Mar. 1, 1995).

Worm et al., "A Robust Self-Calibrating Transmission Scheme for On-Chip Networks", IEEE Transactions on Very Large Scale Integration (VLSI) Systems, vol. 13, No. 1, Jan. 2005, pp. 125-139.

Bertozzi et al., "Error Control Schemes for On-Chip Communication Links: The Energy-Reliability Tradeoff", IEEE Transactions on Computer-Aided Design of Integrated Circuits and Systems, vol. 24, No. 6, Jun. 2005.

* cited by examiner

OPERATING PARAMETER CONTROL FOR INTEGRATED CIRCUIT SIGNAL PATHS

This application is the U.S. national phase of International Application No. PCT/GB2006/000313, filed 31 Jan. 2006, the entire contents of each of which are hereby incorporated by reference.

This technology relates to the field of integrated circuits. More particularly, this invention relates to the field of controlling operating parameters associated with signal paths within integrated circuits.

BACKGROUND

It is known from the paper "A Robust Self-calibrating Transmission Scheme for On-chip Networks", by Frederick W Worm et al, November 2003 to provide on-chip networks in which operating parameters are adjusted based upon error detection with an automatic repeat request being issued when an error occurs so as to trigger the retransmission of the signals. This technique suffers from the disadvantage of having to provide a mechanism to communicate the need for retransmission of the signals as well as an impact upon system performance, in particular latency, associated with the retransmission.

A study of the relationship between energy reduction and reliability for on-chip communication has been published in the paper "Error Control Schemes for On-chip Communication Links: The Energy-Reliability Tradeoff" by Davide Bertozzi et al, IEEE Transactions on Computer Aided Design of Integrated Circuits and Systems, Volume 24, Number 6, June 2005. This paper compares the techniques of using error correction codes transmitted with the data and data retransmission for dealing with the transmission errors which occur as a consequence of measures to reduce energy consumption for the transmission, e.g. voltage reduction etc. The conclusion of Bertozzi is that retransmission is the preferred mechanism for dealing with such errors.

Benini L et al: "Networks on Chips: A new SOC Paradigm" Computer, vol. 35, no. 1, January 2002 discusses on-chip micronetworks, designed with a layered methodology, which will meet the distinctive challenges of providing functionally correct, reliable operation of interacting system-on-chip components.

Beers G E et al: "A Novel memory bus driver/receiver architecture for higher throughput" VLSI Design, 1998. Proceedings., 1998 Eleventh International Conference on Chennai, India 4-7 Jan. 1998, IEEE Comput. Soc, US, 4 Jan. 1998 (1998-01-04), pages 249-264 describes a high-speed memory bus interface which enables greater throughput for data reads and writes is described in this paper. Current mode CMOS logic synthesis methods are used to implement multi-valued logic (MVL) functions to create a high bandwidth bus. First, a fundamental bi-directional data bus for multiple logic levels is presented. Then a bi-directional data bus with impedance matching terminators is presented. Finally a novel Adaptive Multi-Level Simultaneous bi-directional Transceiver (AMLST) bus structure for cache or main memory is proposed. The proposed bus can balance the memory channel bandwidth with the instruction execution rate of modern processors. Despite the problems encountered in implementing complete systems with MBL circuits, among which are circuit speed and design automation support, there is great potential in the future for this approach.

Zimmer H et al: "A fault model notation and error-control scheme for switch-to-switch buses in a network-on-chip" Codes+ISSS 2003. 1st IEEE/ACM/IFIP International Coference On Hardware/Software Codesign & System Synthesis. Newport Beach, Calif., Oct. 1-3, 2003, IEEE/ACM/IFIP International Coference on Hardware/Software Codesign & System Synthesis, New York, N, vol. CONF. 1, 1 October 2003 (2003-10-01), pages 188-193 proposes that the reliability of a Network-On-Chip will be significantly influenced by the reliability of the switch-to-switch connections. Faults on these buses may cause disturbances on multiple adjacent wires, so that errors on these wires can no longer be considered as statistically independent form one another, as it is expected due to deep submicron effects. A new fault model notation for buses is proposed which can represent multiple-wire, multiple-cycle faults. An estimation method based on this notation is presented which can accurately predict error probabilities. This method is used to examine bus encoding schemes. Finally, an encoding scheme for four Quality-of-Service classes is proposed which can be dynamically selected for each packet.

SUMMARY

Viewed from one aspect, an integrated circuit comprises:
a signal source;
a signal destination;
a signal path connecting said signal source and said signal destination, said signal source being operable to add error correcting codes to signals sent from said signal source to said signal destination and said signal destination being operable to use said error correcting codes to correct communication errors in said signals as received by said signal destination; and a signal path controller operable to detect said communication errors and in dependence upon said detected communication errors to dynamically adjust one or more operating parameters of said signal path;

wherein said one or more operating parameters of said signal path comprise one of more of:
signal voltage level;
operating clock frequency;
body bias voltage level; and
operating temperature.

The inventors recognized that a combination of dynamic control based upon detected errors with the use of error correction codes to avoid the need to retransmit data provides a synergistic combination in which energy consumption associated with signal transmission is reduced within an integrated circuit whilst at the same time not adversely impacting latency and other performance parameters, as well as not unduly complicating the communication mechanisms.

In contrast to the normal design prejudices within the field of integrated circuits where the operating parameters of the integrated circuits are typically padded to provide sufficient margin that signal errors are extremely unlikely, the present technique instead actively controls the operating parameters to maintain a target non-zero rate of detected communication errors. Maintaining this finite error rate helps improve the reduction in energy consumption achieved whilst the error correcting codes are able to avoid data loss or the need for data retransmission.

It will be appreciated that the operating parameters being controlled could take a wide variety of different forms. The present technique is particularly useful in controlling parameters including signal voltage level, transmission clock frequency, body biased voltage level and operating temperature. The levels set for these parameters typically have a strong influence upon the energy consumed. As an example, the energy consumed has a squared dependence upon the signal voltage level.

Whilst the present technique could be applied to a single bit serial signal, it is particularly suited to multi-signal signal paths, such as are typically found on communication buses, whether shared or exclusive, within integrated circuits.

Within the context of such multi-signal signal paths, it is possible that all of the signal lines would be controlled in the same manner and have their operating parameters all adjusted in the same, or similar ways, however preferred embodiments may serve to actively control only some of the signal lines with other of the signal lines having fixed operating parameters or operating parameters controlled in another way. As an example, control signals which are more likely to be involved in critical timing paths may be driven with fixed high voltage signal levels to ensure rapid and reliable transmission whereas data or address signals which are less likely to be timing critical may be subject to the dynamic control and lower signal voltage levels of the present technique.

In preferred embodiments the signal path controller provides closed-loop feedback control of the operating parameters in dependence upon the detected communication errors, and more preferably upon an averaged rate of the detected communication errors.

It will be appreciated that the signal path controller could control the operating parameters in a variety of different ways. In preferred embodiments, the signal path controller serves to rapidly change an operating parameter when too many errors are detected so as to avoid data loss/corruption at the cost of increased energy consumption whilst changing the operating parameter as a consequence of too few errors being detected at a slower rate so as to more gradually converge to the state at which the predetermined non-zero error rate is maintained.

In the context of a system as a whole, the control being provided by the signal path controller may advantageously be overridden by other occurrences within the integrated circuit. As an example, a change in the operating mode of the integrated circuit, the nature of the data being transmitted, or a change in another operating parameter of the integrated circuit as a whole may be used to override the control being provided at a more local level by the signal path controller. As an example, if the integrated circuit is suddenly required to perform a high priority piece of processing, then the normal balance between energy consumption and performance will be changed and the integrated circuit moved into a maximum performance configuration with the signal path controller being overridden. In a similar way, if highly critical data is being processed, then it may be appropriate to suppress errors to the maximum possible extent and accordingly the normal action of the signal path controller overridden so as to reduce the likelihood of occurrence of errors which might defeat the capabilities of the errors correction codes to be corrected.

It will be appreciated that in the above the signal source and the signal destination are part of the same integrated circuit and will typically form part of different functional units within that integrated circuit. These different functional units could have a wide variety of different forms as are typical on system-on-chip designs.

Another aspect provides apparatus for processing data comprising:
 a memory integrated circuit;
 a memory accessing integrated circuit;
 an external memory signal path connecting said memory integrated circuit and said memory accessing integrated circuit, at least a respective one of said memory integrated circuit and said memory accessing integrated circuit being operable to add error correcting codes to memory signals transmitted there between upon said external memory signal path and to use said error correcting code to correct communication errors in said memory signals as received; and
 a signal path controller operable to detect said communication errors and in dependence upon said detected communication errors to dynamically adjust one or more operating parameters of said external memory signal path;
 wherein said one or more operating parameters of said signal path comprise one of more of:
  signal voltage level;
  operating clock frequency;
  body bias voltage level; and
  operating temperature.

The present technique is also strongly advantageous in the communication path between a memory integrated circuit and a memory accessing integrated circuit. This communication path is off-chip and accordingly will tend to use high capacitance signal lines which can consume a significant proportion of the energy of the system as a whole. Accordingly, applying the present techniques of dynamic control of the operating parameters for this communication path is strongly advantageous.

A further aspect provides an integrated circuit comprising:
 a signal source;
 a signal destination;
 a signal path connecting said signal source and said signal destination;
wherein
 said signal path is a multi-signal signal path with a first set of one or more operating parameters being applied to a first set of signals of said multi-signal signal path and a second set of one or more operating parameters being applied to a second set of signals of said multi-signal signal path;
wherein said one or more operating parameters of said signal path comprise one of more of:
 signal voltage level;
 operating clock frequency;
 body bias voltage level; and
 operating temperature.

This aspect recognizes that in some circumstances a significant energy saving may be made by statically configuring different signals upon a multi-signal signal path to use fixed, but differing operating parameters. The different signals will tend to have fixed and known uses and characteristics enabling the operating parameters associated with the signal paths for those signals to be chosen to match those requirements. As an example, the signal voltage used for timing critical control signals can be set to a fixed and higher level than is used for the associated address or data signals upon a given bus.

A further aspect provides a method of operating an integrated circuit, said method comprising the steps of:
 connecting a signal source and a signal destination by a signal path;
 adding error correcting codes to signals sent from said signal source to said signal destination;
 detecting communication errors in said signals as received by said signal destination;
 using said error correcting codes to correct said communication errors; and
 in dependence upon said detected communication errors, dynamically adjusting one or more operating parameters of said signal path;

wherein said one or more operating parameters of said signal path comprise one of more of:
signal voltage level;
operating clock frequency;
body bias voltage level; and
operating temperature.

Figure 2:
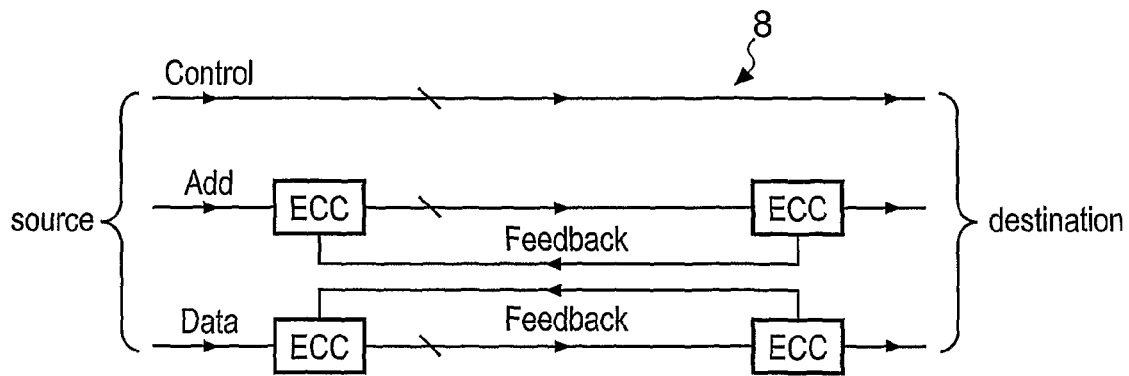
Figure 3:
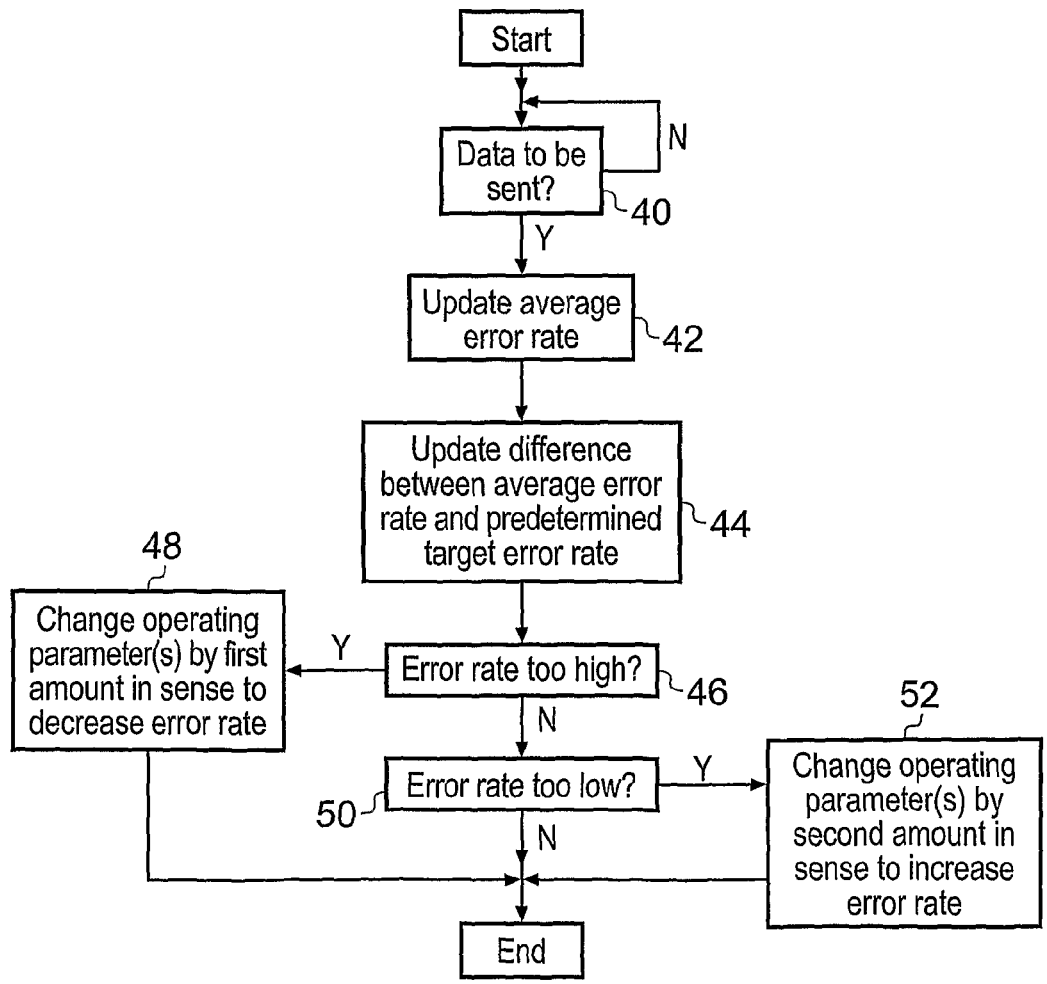
Figure 4:
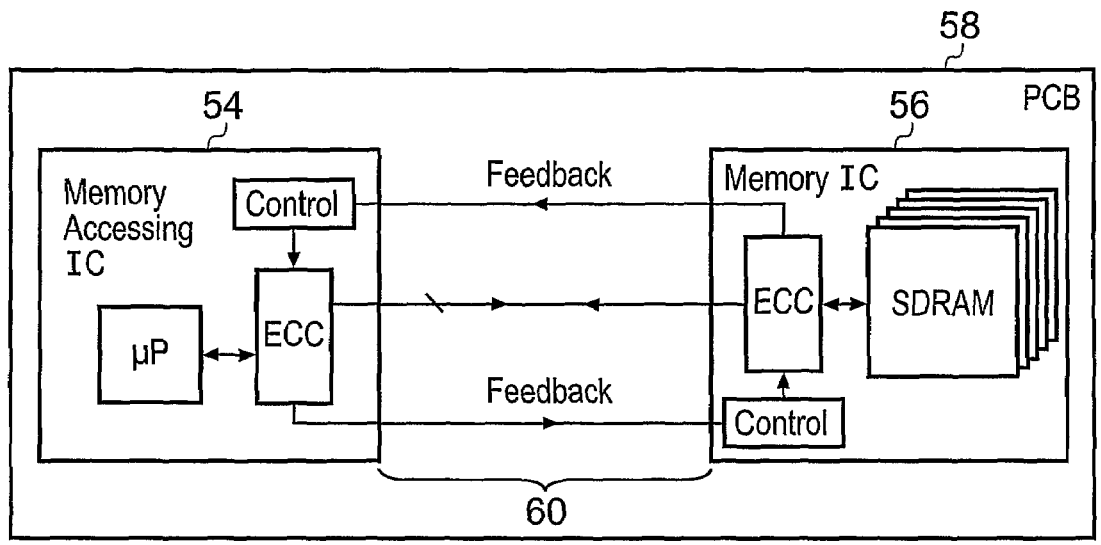
Figure 5:
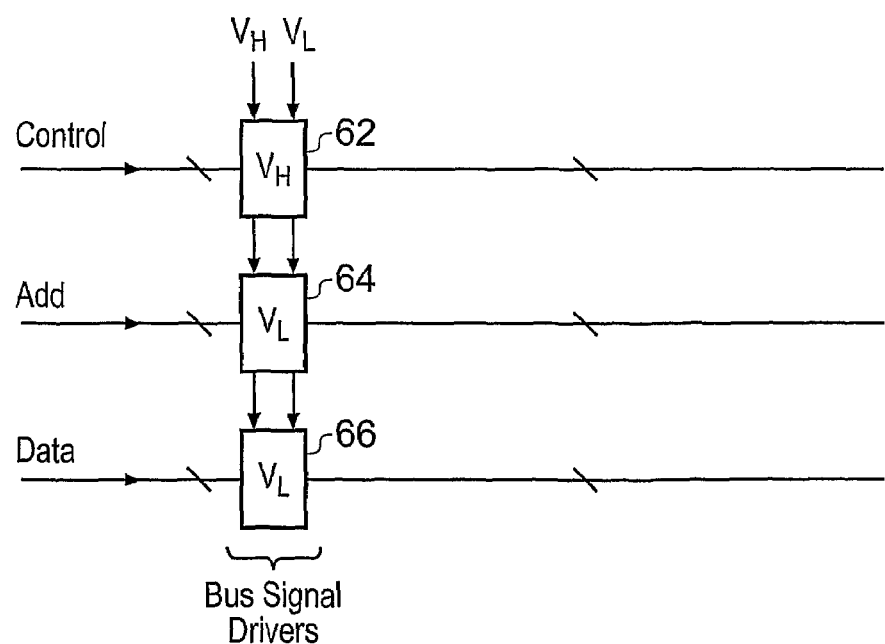
Figure 6:
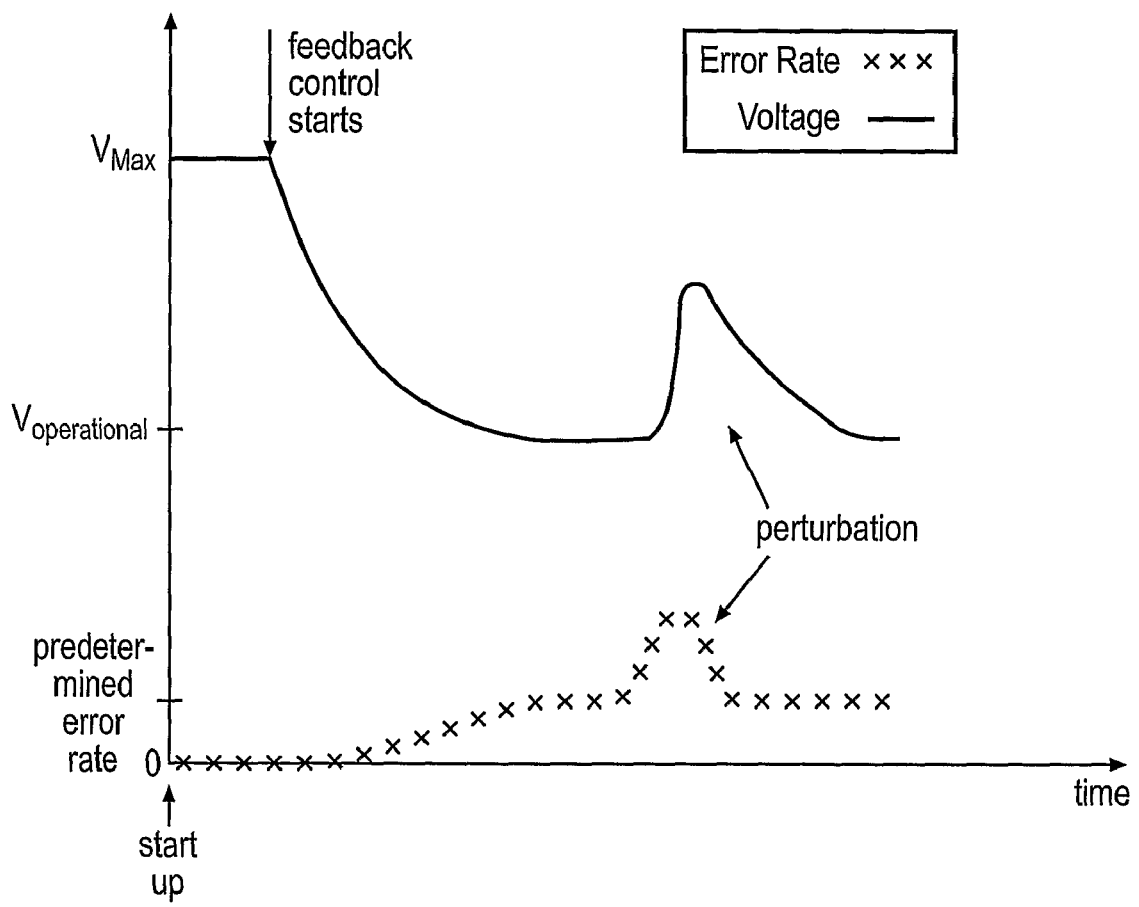

Non-limiting, example embodiments will now be described by way of example only, with reference to the accompanying drawings in which:

FIG. 1 schematically illustrates an integrated circuit incorporating a signal path with dynamic operating parameter control;

FIG. 2 schematically illustrates a multi-signal signal path in which dynamic operating parameter control is applied to a subset of the signals;

FIG. 3 is a flow diagram schematically illustrating the control processes performed by a control signal generator of FIG. 1;

FIG. 4 schematically illustrates a printed circuit board including a memory accessing integrated circuit and a memory integrated circuit communicating via a memory signal path which is subject to dynamic operating parameter controls;

FIG. 5 schematically illustrates a multi-signal signal path in which fixed differing operating parameters are applied to different signals within that multi-signal signal path; and FIG. 6 is a graph schematically illustrating the variation with time of signal voltage level and detected error rate.

DESCRIPTION OF EXAMPLE EMBODIMENTS

FIG. 1 illustrates an integrated circuit 2 including a plurality of signal sources 4, 6 communicating via a signal path 8 with a plurality of signal destinations 10, 12. In this example, it will be seen that the signal sources are sharing the error correction encoding and signal driving and level shifting circuits 14, 16. It will be appreciated that it will be possible to provide dedicated (to each source) encoding and driving/shifting circuits as appropriate. The integrated circuit 2 will typically be a system-on-chip integrated circuit in which a plurality of functional units are provided serving as signal sources 4, 6, signal destinations 10, 12, or functional units that serve both roles. The elements of the integrated circuit 2 illustrated in FIG. 1 are chosen to show the present technique of combined error correction coding with dynamic operating parameter control based upon detected errors. It will be appreciated by those in this technical field that in practice an integrated circuit 2 will typically contain many further circuit elements performing different functions, but these have not been shown in FIG. 1 for the sake of simplicity.

The signal source 4 as part of its operation transmits a multi-signal signal across the signal path 8 to the signal destination 10. This multi-signal signal passes through an error correction encoding stage 14 and then a signal driver and level shifting stage 16 before being driven on the signal lines eighteen. At the other end a level shifting circuit receives the multi-signal signal and supplies it to an error correcting code error detection and correcting circuit 22 before the signal is passed to the signal destination 10. The form of error correction coding employed can vary and a wide variety of techniques are known to those in this technical field. One example technique which may be employed is Hamming codes. The present technique is not however limited to Hamming codes.

The voltage at which the driver and level shift circuit 16 drives the signals onto the signal path 8 is dynamically controlled in dependence upon a control signal $V_{control}$ generated by a control signal generator 24. More particularly, an input voltage $V_{IN}$ supplied to the integrated circuit 2 will be modified by a signal drive voltage controller 26, which can act to set a chipwide voltage level using technique such as IEM provided by ARM Limited, Cambridge, England. Beneath this chipwide control setting $V_{drive}$, the driver and level shift circuit 16 further controls the voltage used to drive the signals on the signal path 8 to a lower level in dependence upon the voltage control signal $V_{control}$ In particular, the drive voltage is lowered to a level at which a finite non-zero error rate in the signals reaching the error correction code error detecting and correction circuit 22 is maintained. The errors which occur are sufficiently infrequent and effects sufficiently few bits that they can be corrected by the redundant information provided by the error correction codes that were added by the error correction encoding circuit 14. Thus, the latency of the communication between the signals source 4 and the signal destination 10 is not increased and retransmission is not necessary.

When the error correction coding error detection and correcting circuit 22 detects an error, it signals this to an averaging circuit 28 which serves to generate an output indicative of the averaged error rate per transmission. The averaging performed by the average circuit 28 can be adjusted in dependence upon a programmable time constant stored within a time constant register 30. The average error rate signal generated by the average circuit 28 is input to a comparator 32 together with a signal indicative of the predetermined target error rate as output by a programmable predetermined error rate register 34. The difference between these two signals as generated by the comparator 32 is supplied as an input to the control signal generator 24. If this difference signal indicates that the error rate is too large, then the control signal generator 24 will react so as to alter the voltage control signal $V_{control}$ to increase the signal voltage level being applied by the driver and level shift circuit 16. The control signal generator 24 can be configured with a plurality of sets of control parameters stored within control parameter registers 36 so as to perform a rapid increase in signal voltage level when the error rate is too high whilst performing a relatively slow relaxation in the signal voltage level when the error rate is too low. When the comparator 32 indicates that the error rate is too low, i.e. below the predetermined error rate by more than a threshold amount, then the control signal generator 24 alters the voltage control signal $V_{control}$ so as to force the driver and level shift circuit 16 to reduce the signal voltage level being used.

In addition to the signal voltage level control illustrated in FIG. 1, the control signal generator 24 can also produce control signals to change the body bias voltage, the clock frequency and the temperature associated with at least the signal path 8. These parameters can have a strong influence upon the energy consumed and may be targeted at the signal paths concerned. As an example, the signal paths could be located within a suitable domain having its own control of body bias voltage and maybe transmitted at a clock frequency rate which can be altered separately from the overall clock rate of the integrated circuit 2 as a whole. Temperature control could be actively provided to all or parts of the integrated circuit using known cooling techniques.

The localized control of the operating parameters of the signal path 8 provided by the mechanisms 22, 28, 32, 24 etc illustrated in FIG. 1, which together form a substantial part of the signal path controller, may be overridden by other considerations relevant to the operation of the integrated circuit 2 as a whole. A feedback override controller 38 is responsive to signals, such as signals indicating a particular process and mode (e.g. high priority fast interrupt mode), data type (e.g. streamed media data verses critical control data), application thread ID (ASID), or the like, to generate an override signal supplied to the control signal generator 24. This override signal serves to force the control signal generator 24 to output a voltage control signal $V_{control}$ which in turn forces the driver and level shift circuit 16 to adopt a higher signal voltage level as appropriate in this override state.

FIG. 2 schematically illustrates a multi-signal signal path 8 formed of respective multi-bit control, address and data portions. As will be appreciated, the control signals are in this example more frequently associated with timing critical paths and so it is desirable that these should always be driven at a high voltage. Conversely, the address and data signals are less likely to be on timing critical paths and accordingly, as is schematically illustrated, may be subject to error correction encodings/decoding operation and dynamic feedback control of their operating parameters in a manner seeking to reduce the energy consumed in their transmission. FIG. 2 shows the control/feedback taking place over part of a bus, although it will be appreciated this could be over an entire bus.

FIG. 3 is a flow diagram schematically illustrating the processing and control which is described in relation to FIG. 1. At step 40, the control system waits until data is sent. When data is sent, it is error correction encoded (e.g. Hamming encoded) and then subject to error detection and decoding upon receipt. The outcome of the error detection, whether positive or negative, is used to update the average error rate at step 42. At step 44, the difference between the average error rate and the predetermined target error rate is also updated. At step 46, a determination is made as to whether the error rate is too high. If the error rate is too high, then step 48 serves to change the operating parameter(s), such as signal voltage, temperature, body bias voltage, signal transmission frequency, etc, by a first amount in a sense to decrease the error rate. It will be appreciated that signal voltage level is typically increased to decrease the error rate. Temperature reduction, body bias voltage increase and clock frequency decrease are also changes in a sense which is intended to decrease the error rate.

If the determination at step 46 was that the error rate was not too high, then step 50 determines whether the error rate is too low. If the error rate is too low, then step 52 serves to change the operating parameter(s) by a second amount in a sense to increase the error rate. It is against the design predjuices within the field of integrated circuits to actively change an operating parameter to increase an error rate. However, in the context of overall energy reduction, step 52 provides a significant contribution in achieving more efficient operation. The first amount of step 48 will typically be large so as to produce a rapid response to two an error rate, whereas the second amount of step 52 will be smaller so as to produce a more gradual response to an error rate which is too low. This is a more reliable way of operating.

FIG. 4 schematically illustrates an embodiment of the present technique in which a memory accessing integrated circuit 54 and a memory integrated circuit 56 are provided on a printed circuit board 58 and joined by a memory signal path 60. The memory signal path 60 is an off-chip signal path with an associated relatively high capacitance and accordingly an associated relatively high energy consumption. As is schematically illustrated at each end of the bi-directional memory signal path 60 are provided error encoding/decoding circuits and circuits for controlling the operating parameters associated with the signal path 60. Feedback signals are added to the memory signal path 60 so that the respective drivers for transmission can be appropriately controlled. The operating parameters of the off-chip memory and signal path 60 which can readily be controlled include signal voltage level and clock frequency. These parameters have a strong influence upon energy consumption.

FIG. 5 illustrates a further example of the present techniques. In this example driver circuits 62, 64, 66 are associated with signal lines respectively transmitting control, address and data signals. The driver circuits 62, 64, 66 are each provided with both a fixed high voltage $V_H$ and a fixed low voltage $V_L$. The timing critical nature of the control signals as previously discussed is such that the driver 62 selects the high voltage signal $V_H$ to drive the signal lines output therefrom. Conversely, since the address and data signals are less timing critical, the driver circuits 64, 66 are able to select the low voltage $V_L$ to drive their outputs. This results in a reduction in energy consumption for the overall transmission of the signal comprising the control, address and data. This combination of signals performs a communication transaction and is associated together. The signals might not necessarily be transmitted at the same time, but are at least logically associated.

FIG. 6 is a graph schematically illustrating how signal voltage level and error rate vary with time. When an integrated circuit 2 is powered on, the maximum signal voltage level is used for a starting period so as to enable the signals to settle to stable operation. As indicated, feedback control then starts and as the error rate is below the predetermined target error rate the voltage used for the signal voltage level is slowly relaxed. The error rate then climbs until it reaches the predetermined error rate at which the operational voltage for the signal level is established and held.

Also illustrated in FIG. 6 is the response to a perturbation in the system. This perturbation could arise for a variety of different reasons, such as external parameters including temperature, RF noise, etc. As is illustrated, the signal voltage is rapidly increased so as to suppress the error rate back down to the predetermined error rate. The signal voltage level then slowly relaxes back down to the normal operational signal voltage level. Whilst the increase in error rate detected in FIG. 6 increases the use of the error correction codes which are provided, the errors in the signal transmission are corrected and transmission takes place first time without needing a retransmission. It will be appreciated by those in the field that absolutely error free correction is not possible, but the error correction codes provided and the way that the finite non-zero error rate is selected is such that the normal capabilities of the error correction codes are not exceeded.

The invention claimed is:

1. An integrated circuit comprising:
    a signal source;
    a signal destination;
    a signal path connecting said signal source and said signal destination, said signal source being operable to add error correcting codes to signals sent from said signal source to said signal destination and said signal destination being operable to use said error correcting codes to correct communication errors in said signals as received by said signal destination; and
    a signal path controller configured to detect said communication errors and in dependence upon said detected communication errors to dynamically adjust one or more operating parameters of said signal path;
    wherein said one or more operating parameters of said signal path comprise one of more of:
    signal voltage level;
    operating clock frequency;
    body bias voltage level; and
    operating temperature, wherein said signal path controller is configured to provide closed-loop feedback control of said one or more operating parameters in dependence upon said detected communication errors.

2. An integrated circuit as claimed in claim 1, wherein said signal path controller dynamically adjusts said one or more operating parameters to maintain a target non-zero rate of said detected communication errors.

3. An integrated circuit as claimed in claim 1, wherein said signal path is a multi-signal signal path.

4. An integrated circuit as claimed in claim 3, wherein said signal path controller is operable to control said one or more operation parameters of said multi-signal signal path in respect of subset of signals communicated by said multi-signal signal path.

5. An integrated circuit as claimed in claim 4, wherein operating parameters for one or more control signals communicated by said multi-signal signal path are fixed.

6. An integrated circuit as claimed in claim 4, wherein one or more operating parameters for one or more data signals communicated by said multi-signal signal path are dynamically varied by said signal path controller.

7. An integrated circuit as claimed in claim 1, wherein at least part of said signal path is shared with at least one of:
a further signal source; and
a further signal destination.

8. An integrated circuit as claimed in claim 1, wherein said signal source and said signal destination are part of different functional blocks with a system-on-chip integrated circuit.

9. An integrated circuit comprising:
a signal source;
a signal destination;
a signal path connecting said signal source and said signal destination, said signal source being operable to add error correcting codes to signals sent from said signal source to said signal destination and said signal destination being operable to use said error correcting codes to correct communication errors in said signals as received by said signal destination; and
a signal path controller configured to detect said communication errors and in dependence upon said detected communication errors to dynamically adjust one or more operating parameters of said signal path;
wherein said one or more operating parameters of said signal path comprise one of more of:
signal voltage level;
operating clock frequency;
body bias voltage level; and
operating temperature,
wherein said signal path controller is configured to control said one or more operating parameters in dependence upon an averaged rate of said detected communication errors.

10. An integrated circuit comprising:
a signal source;
a signal destination;
a signal path connecting said signal source and said signal destination, said signal source being operable to add error correcting codes to signals sent from said signal source to said signal destination and said signal destination being operable to use said error correcting codes to correct communication errors in said signals as received by said signal destination; and
a signal path controller configured to detect said communication errors and in dependence upon said detected communication errors to dynamically adjust one or more operating parameters of said signal path;
wherein said one or more operating parameters of said signal path comprise one of more of:
signal voltage level;
operating clock frequency;
body bias voltage level; and
operating temperature,
wherein said signal path controller is operable to change said one or more operating parameters in a first direction at a rate greater than in a second direction, a change in said first direction being such as to reduce said detected communication errors.

11. An integrated circuit comprising:
a signal source;
a signal destination;
a signal path connecting said signal source and said signal destination, said signal source being operable to add error correcting codes to signals sent from said signal source to said signal destination and said signal destination being operable to use said error correcting codes to correct communication errors in said signals as received by said signal destination; and
a signal path controller configured to detect said communication errors and in dependence upon said detected communication errors to dynamically adjust one or more operating parameters of said signal path;
wherein said one or more operating parameters of said signal path comprise one of more of:
signal voltage level;
operating clock frequency;
body bias voltage level; and
operating temperature,
wherein said signal path controller is responsive to one or more control signals serving to at least temporarily override control based upon detected communication errors.

12. An integrated circuit as claimed in claim 11, wherein said one or more control signals include one or more of:
a signal indicative of an operating parameter change for at least a portion of said integrated circuit including said signal path;
a signal indicative of a type of signal being communicated over said signal path; and
a processing mode of said integrated circuit.

13. Apparatus for processing data comprising:
a memory integrated circuit;
a memory accessing integrated circuit;
an external memory signal path connecting said memory integrated circuit and said memory accessing integrated circuit, at least a respective one of said memory integrated circuit and said memory accessing integrated circuit being configured to add error correcting codes to memory signals transmitted therebetween upon said external memory signal path and to use said error correcting code to correct communication errors in said memory signals as received; and
a signal path controller configured to detect said communication errors and in dependence upon said detected communication errors to dynamically adjust one or more operating parameters of said external memory signal path;
wherein said one or more operating parameters of said signal path comprise one of more of:
signal voltage level;
operating clock frequency;
body bias voltage level; and
operating temperature, wherein said signal path controller is configured to provide closed-loop feedback control of said one or more operating parameters in dependence upon said detected communication errors.

14. A method of operating an integrated circuit, said method comprising the steps of:
- connecting a signal source and a signal destination by a signal path;
- adding error correcting codes to signals sent from said signal source to said signal destination;
- detecting communication errors in said signals as received by said signal destination;
- using said error correcting codes to correct said communication errors; and
- in dependence upon said detected communication errors, dynamically adjusting one or more operating parameters of said signal path;

wherein said one or more operating parameters of said signal path comprise one of more of:
- signal voltage level;
- operating clock frequency;
- body bias voltage level; and
- operating temperature, wherein said step of dynamically adjusting provides closed-loop feedback control of said one or more operating parameters in dependence upon said detected communication errors.

* * * * *